(12) United States Patent
Betz

(10) Patent No.: US 6,913,291 B1
(45) Date of Patent: Jul. 5, 2005

(54) THREADED HOSE-IN-HOSE COUPLER

(76) Inventor: James C. Betz, 111 S. Main St., South Bend, IN (US) 46601

( * ) Notice: Subject to any disclaimer, the term of this patent is extended or adjusted under 35 U.S.C. 154(b) by 0 days.

(21) Appl. No.: 10/700,396

(22) Filed: Nov. 4, 2003

Related U.S. Application Data

(63) Continuation-in-part of application No. 10/252,230, filed on Sep. 23, 2002, now Pat. No. 6,682,102.

(51) Int. Cl.[7] .............................................. F16L 39/04
(52) U.S. Cl. .............................. 285/123.15; 285/123.1; 285/284.1
(58) Field of Search ........................ 285/31, 32, 123.1, 285/123.15, 123.16, 123.17, 284.1

(56) References Cited

U.S. PATENT DOCUMENTS

| | | | |
|---|---|---|---|
| 578,474 A | 3/1897 | Thompson et al. | |
| 797,911 A | 8/1905 | Perry | |
| 1,160,703 A | * 11/1915 | Fleming | 285/123.15 |
| 1,217,543 A | 2/1917 | White | |
| 1,349,663 A | 8/1920 | Cumfer | |
| 4,108,476 A | 8/1978 | Krupp | |
| 4,687,232 A | 8/1987 | Zimmerman | |
| 5,011,193 A | 4/1991 | Porte | |
| 5,088,774 A | 2/1992 | Spiegelman | |
| 5,141,256 A | 8/1992 | Ziu | |
| 5,547,231 A | 8/1996 | Sharp | |
| 6,196,596 B1 | 3/2001 | Kwok et al. | |
| 2002/0093195 A1 | 7/2002 | Poehler | |

FOREIGN PATENT DOCUMENTS

| | | |
|---|---|---|
| CA | 672802 | 10/1963 |
| DE | 1119609 | 2/1961 |
| DE | 3936588 | 5/1991 |
| DE | 10064227 | 6/2002 |
| FR | 1529814 | 6/1968 |

* cited by examiner

Primary Examiner—Aaron Dunwoody

(57) ABSTRACT

A hose-in-hose coupler having a primary or inner hose assembly and a surrounding secondary or outer hose assembly. The secondary hose assembly is connected by opposing retractable sleeves which when disconnected may by retracted or separated to expose the primary hose assembly.

11 Claims, 8 Drawing Sheets

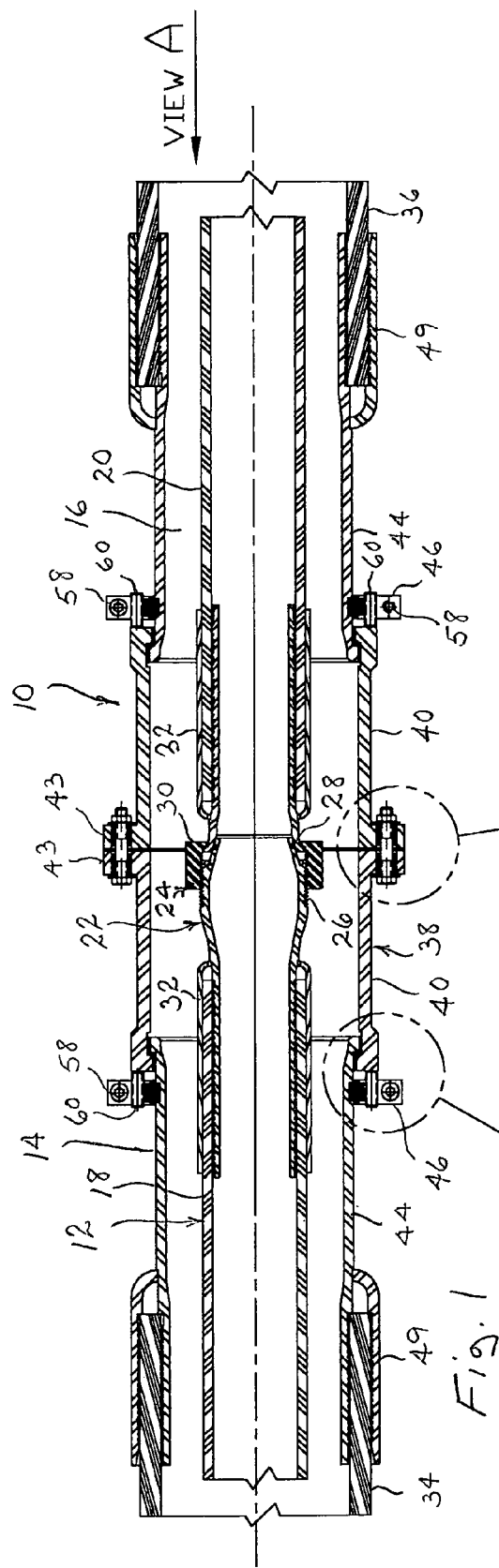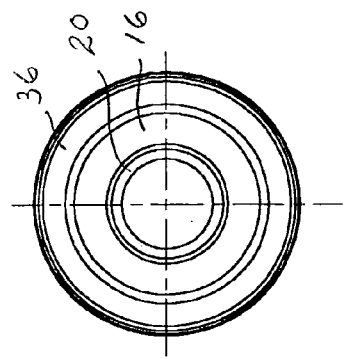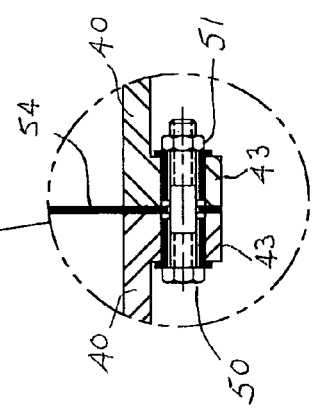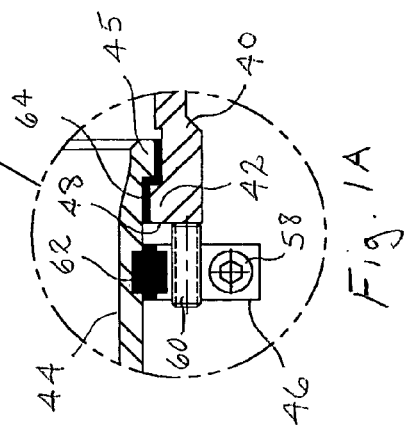

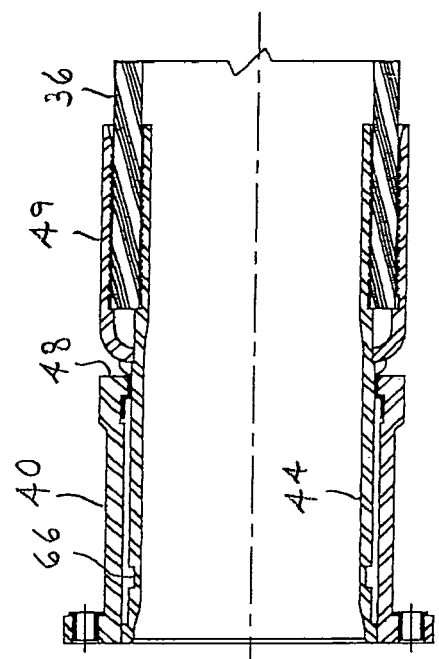
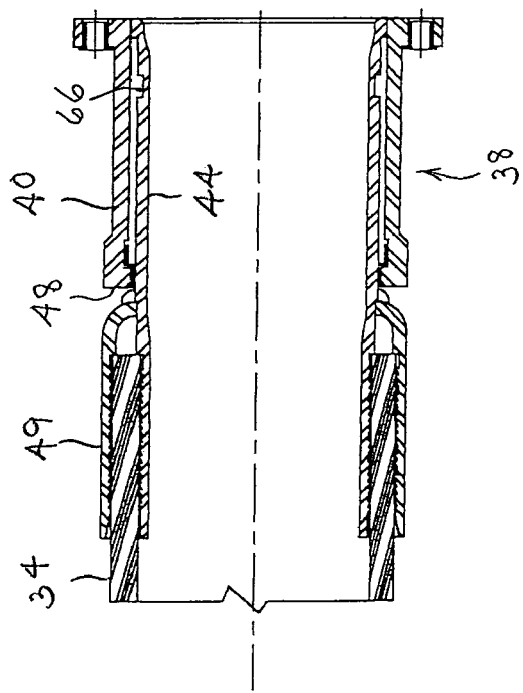
Fig. 5

THREADED HOSE-IN-HOSE COUPLER

CROSS REFERENCE TO RELATED APPLICATIONS

This Application is a continuation-in-part of non-provisional U.S. patent application Ser. No. 10/252,230, filed Sep. 23, 2002, now U.S. Pat. No. 6,682,102.

BACKGROUND OF THE INVENTION

1. Field of the Invention

The present invention relates to a hose-in-hose or double walled hose, and, more particularly, to a hose-in-hose secondary coupler.

2. Description of the Related Art

It is known that hose-in-hoses have been used to transport liquid waste, such as nuclear waste, to a place away from the source.

A problem with current hose-in-hose configurations is that once the outer hose is disconnected via a coupler, the separated ends of the outer hoses must be physically pulled apart to allow access to the inner hose. Although on shorter lengths of hose this may not present much of a problem, as the length of the hose increases the difficulty in providing adequate force to pull apart the disconnected ends also increases. The ability to adequately separate the disconnected ends of the outer hose to a significant distance thereby allowing access to the inner hose relies on the strength of the end user. Furthermore, longer hoses may not be able to be separated at the coupler due to the weight of the individual hose ends.

What is needed is a device which allows access to the inner hose without the need to substantially move the two disconnected ends of the outer hose.

SUMMARY OF THE INVENTION

The invention disclosed herein presents a hose-in-hose with an outer coupler which can allow access to the inner hose without substantially moving the two disconnected ends of the outer hose. In one embodiment of the invention, the hose-in-hose includes an inner or primary hose assembly, which includes a primary hose casing and a primary coupler, and an outer or secondary hose assembly, which includes a secondary hose casing and a secondary coupler. The secondary hose assembly encloses the primary hose assembly. The primary coupler connects a first hose casing and a second hose casing of the primary hose casing. The secondary coupler connects a third hose casing and a fourth hose casing of the secondary hose casing. The secondary coupler includes slideable sleeve parts having a joined position connecting the third hose casing and the fourth hose casing. The slideable sleeve parts have an open position which exposes the primary hose assembly.

Another embodiment of the invention includes an inner hose assembly having an inner releasable coupler encased by an outer hose assembly having an outer releasable coupler. The outer coupler is shiftable between an extended position enclosing the inner coupler and a retracted position exposing the inner coupler. The outer coupler includes a pair of opposing sleeves that are threaded onto opposing outer hose casings. The sleeves may be screwed along the threading to retract or extend the sleeves along the hose casings. The opposing sleeves are preferably secured together in their extended positions with fasteners. A threaded collar may be screwed over the hose casings behind each of the sleeves to further secure the sleeves in their extended positions.

Accordingly, it is an object of the present invention to provide for an improved way for accessing the primary hose in a hose-in-hose assembly.

BRIEF DESCRIPTION OF THE DRAWINGS

These and other features and advantages of the invention will become more apparent from the following detailed description taken in conjunction with the accompanying drawings, in which:

FIG. 1 is a longitudinal sectional view of an embodiment of the present invention showing the primary and secondary hose assemblies connected with FIGS. 1A and 1B showing detailed components and FIG. 1C being an end view A;

FIG. 5 is a longitudinal sectional view of the secondary hose assembly of FIG. 4 with the sleeves shown in an open or retracted position;

DETAILED DESCRIPTION OF THE DRAWINGS

Figure 2:
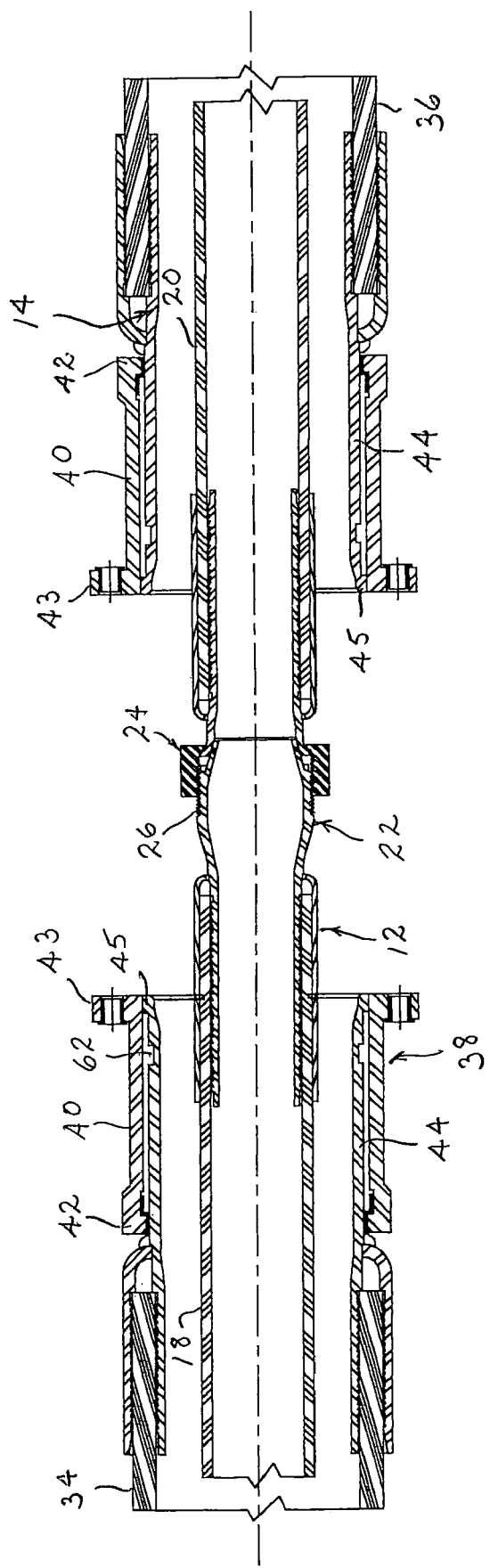
FIG. 2 is a longitudinal sectional view of the hose-in-hose of FIG. 1 showing the secondary coupler disconnected in an open or retracted position and the primary coupler connected.

Referring now to FIGS. 1–6, reference character 10 generally designates a hose-in-hose constructed in accordance with a first embodiment of the present invention. Hose-in-hose 10 includes two distinct components, namely, a primary or inner hose assembly 12 and a secondary or outer hose assembly 14. Secondary hose assembly 14 encases the primary hose assembly 12 thereby creating a containment space 16 between the outer surface of the primary hose assembly and the inner surface of the secondary hose assembly for containing any liquids leaking from the primary hose assembly 12 due to a break or tear in the primary hose assembly. Primary hose assembly 12 may be used to transmit and contain liquids, and is particularly suited for transmitting hazardous materials such as nuclear waste, hazardous liquid waste, or contaminated water. FIG. 1 shows hose-in-hose 10 as a closed system, meaning both the primary and secondary hose assemblies 12, 14 are sealed.

Primary hose assembly 12 includes a hose casing 18, a hose casing 20, and a primary or inner coupler 22. Inner coupler 22 connects hose casing 18 and hose casing 20 in such a manner as to create a sealed connection between the two opposing hose casings. Coupler 22 includes a female coupling part 24 and a male coupler part 26, each of which is attached to one of hose casings 18, 20 with a swaged ferrule 32. Female coupling part 24 includes an outturned flanged retainer 28 which carries a rotatable nut 30. Male coupler part 26 is externally threaded and preferably tapered to fit into retainer 28 where it is secured by nut 30.

Secondary hose assembly 14 includes a hose casing 34, a hose casing 36, and a secondary or outer coupler 38. Outer coupler 38 provides for connecting hose casings 34, 36 to create a sealed closed system about primary hose assembly 12. Coupler 38 includes opposing slideable sleeve parts 40, shanks 44, and collars 46. Each shank 44 is attached to its hose casing 34, 36 by a swaged ferrule 49. Sleeve parts 40 are separable having an extended position as shown in FIG. 1 and a retracted position as shown in FIG. 2. Each sleeve part 40 is provided with an in-turned annular flange 42 at one end and an outturned annular flange 43 at the opposite end. Sleeve parts 40 are mounted so as to slide longitudinally along shanks 44. In this manner, the sleeve parts 40 of outer coupler 38 can shift inwardly and outwardly relative to each other between their retracted position and extended position. Each shank 44 is provided with an outturned flange 45 so that as its supported sleeve part 40 slides outwardly over the shank, flange 42 of the sleeve part contacts and abuts flange 45 of the shank, thus restricting any further outward movement and retaining the sleeve part on its shank in its extended position as best seen in FIGS. 1A and 4A.

Figure 4:
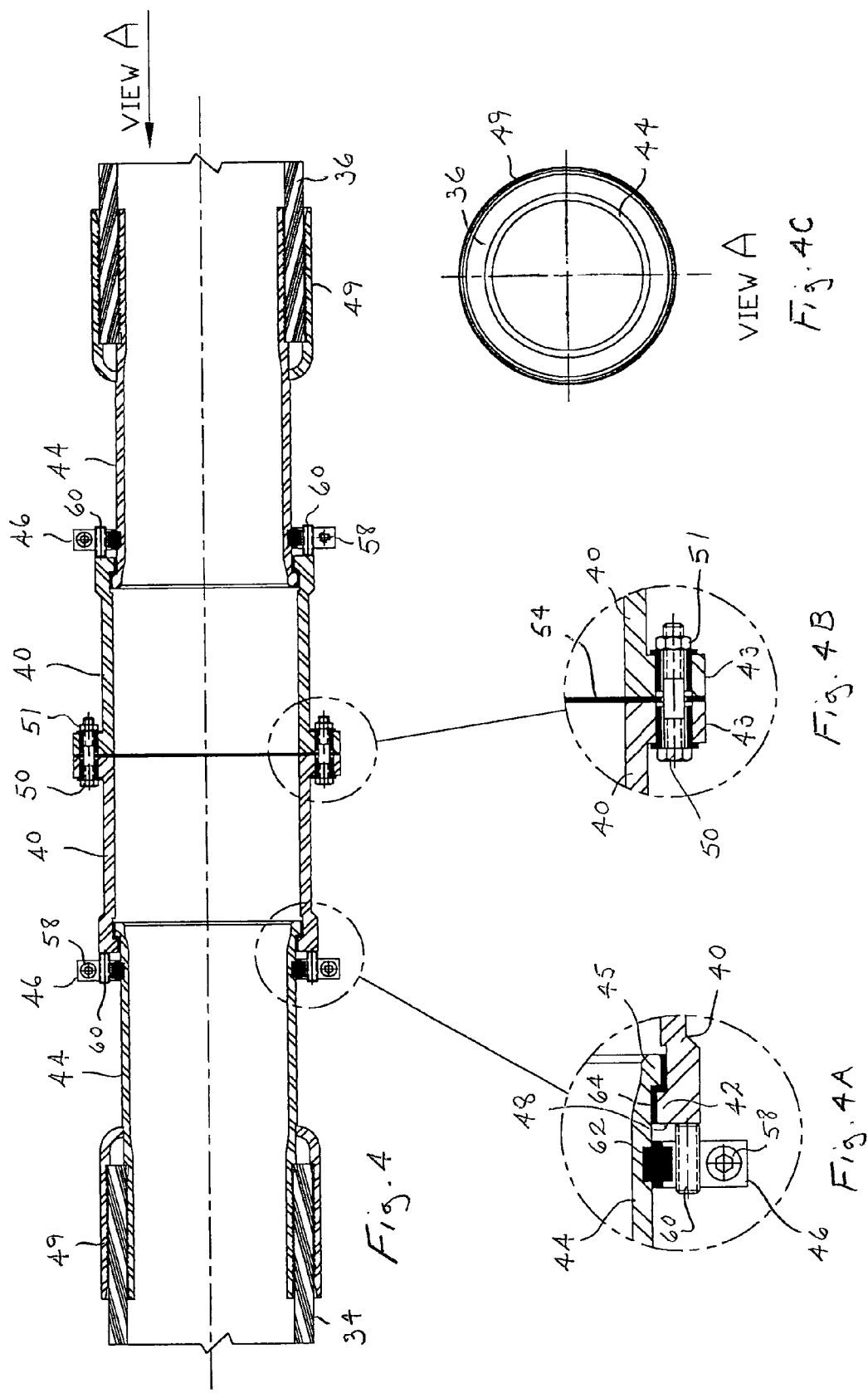
FIG. 4 is a longitudinal sectional view of the secondary hose assembly of FIG. 1 in isolation connected with the sleeves in their extended positions, with FIGS. 4A and 4B showing detailed components and FIG. 4C being an end view A.
Figure 6:
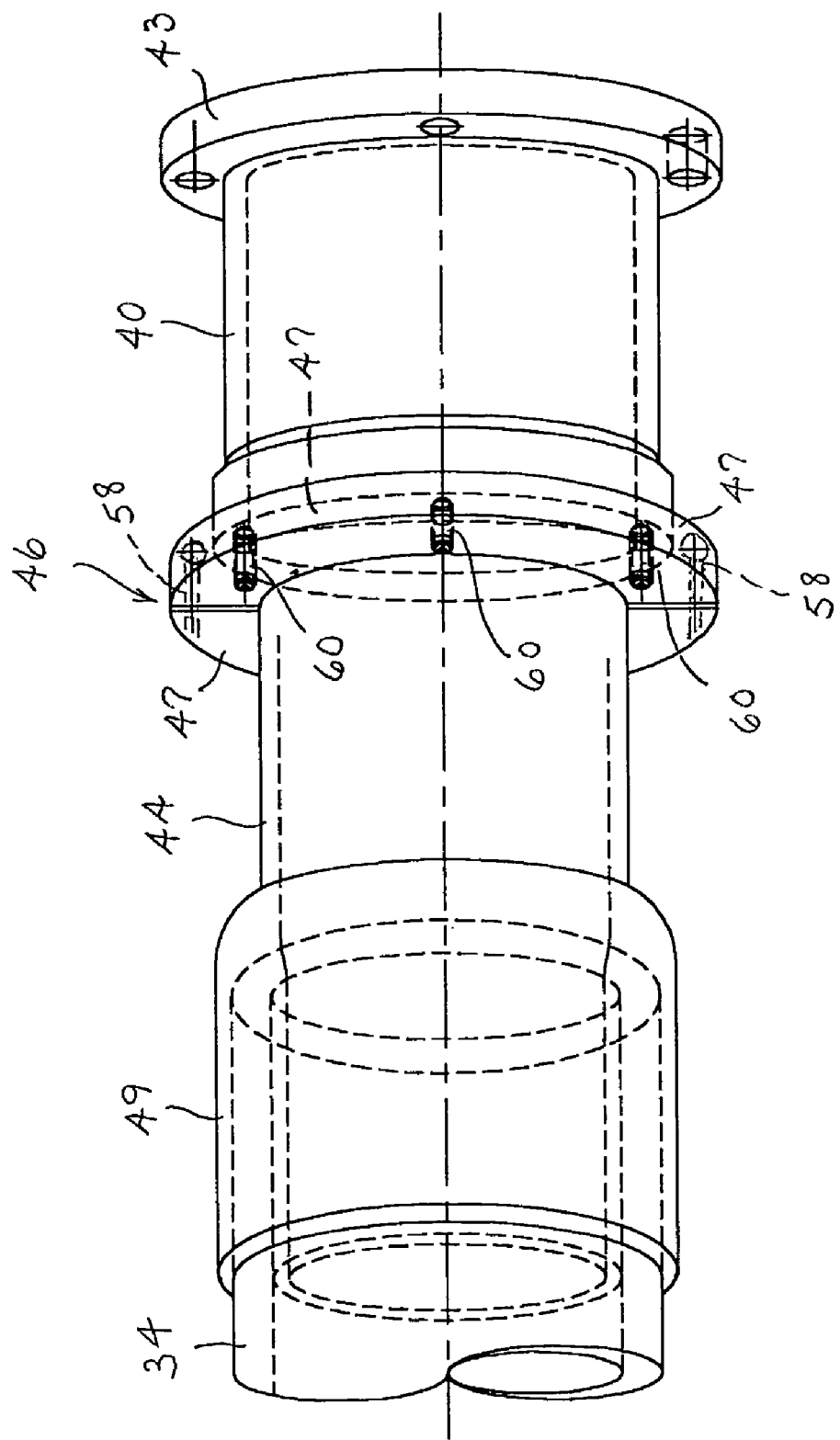
FIG. 6 is a perspective view of the secondary hose assembly showing one secondary hose casing and its secondary coupler part.

As can be seen in FIGS. 1 and 4, when sleeve parts 40 are in their extended position flanges 43 are aligned in a face to face orientation, with, preferably, an annular gasket 54 located between. The flanges 43 are joined and secured by annularly spaced bolts 50 and nuts 51.

Sleeve parts 40 are secured in their extended position upon shanks 44 by collars 46. Each collar is formed of two semi-circular half parts 47 (see FIG. 6) joined by screws 58. Once sleeve parts 40 are extended, parts 47 of collars 46 are placed round shanks 44 and joined by screws 58 with an annular rib 62 carried by each collar fitting restrictively within an annular groove 66 in each shank 44 so as to fixedly position each collar next to the end face 48 of the adjacent sleeve.

Within each collar 46 and arranged peripherally about the collar are threaded bores 59. Securement screws 60 are turned through each collar in bores 59 into contact with the adjacent sleeve end face 48 to urge sleeve flange 42 toward shank flange 45, compressing an annular seal 64 to form a complete liquid seal between each shank and sleeve. Rib 62 may be in the form of an insulator envisioned to work in conjunction with non-conductive hose to allow for the use of a leak detector.

Figure 3:
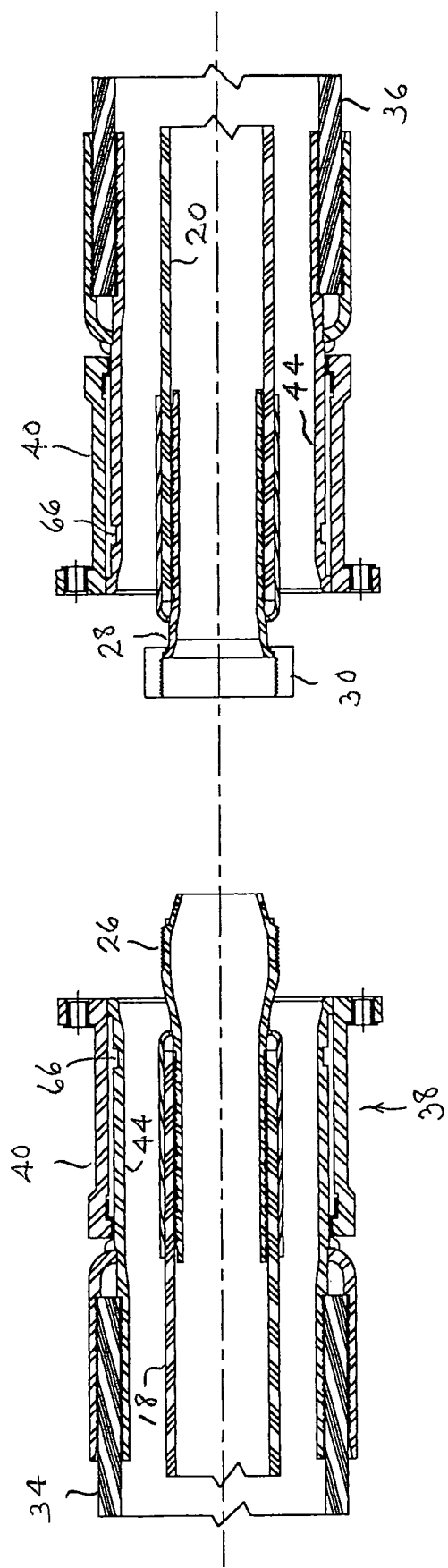
FIG. 3 is a longitudinal sectional view of the hose-in-hose of FIG. 1 showing the both the primary and secondary couplers disconnected or in open positions.

Referring now to FIGS. 2, 3, and 5, sleeve parts 40 are shown in their retracted position thereby opening outer coupler 38. To retract the sleeve parts 40, collars 46 are removed by loosening securement screws 60 and removing screws 58 so the two half parts 47 of each collar can be separated and removed from its shank 44. Then flanges 43 are disconnected from each other by removing bolts 50 and nuts 51, thereby freeing sleeve parts 40 from their secured extended position and allowing outer coupler 38 to be opened by slidably retracting sleeve parts 40 longitudinally along shanks 44. Although collars 46 are shown completely removed, they could also be slid along the sleeve parts 40 after sufficiently loosening bolts 58 sufficiently to allow the collar parts 47 to be spread apart.

When sleeve parts 40 are secured in their extended position, outer coupler 38 is in a joined position connecting hose casings 34, 36 in a sealed position (FIGS. 1 and 4). When sleeve parts 40 are in their retracted position, outer coupler 38 is in an open position (FIGS. 2 and 3) thereby exposing primary hose assembly 12 and its coupler 22 for access.

Hose-in-hose 10 will contain liquids which may leak from a rupture of primary hose assembly 12 and prevent potentially hazardous liquids from causing damage to the environment or injury to the end user. Secondary or outer coupler 38 provides the advantage of allowing access to the primary hose assembly 12 via the use of slideable sleeve parts 40 without needing to further separate hose casings 34, 36. Further, the use of insulated materials would allow use of a signal or an alarm device, which may be present on or around the assembly, thereby notifying the end user of leakage from the primary hose.

Figure 7:
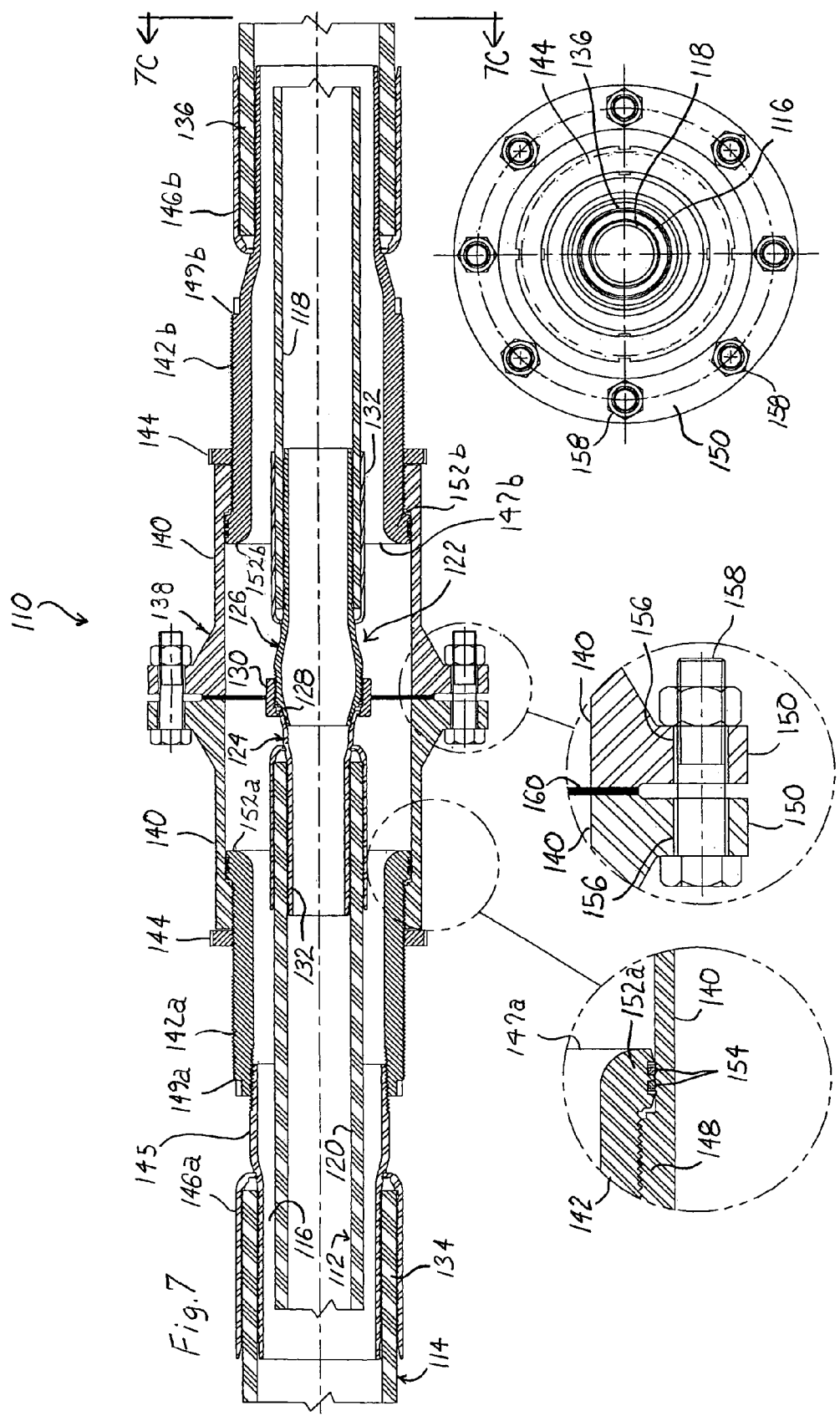
FIG. 7 is a longitudinal sectional view of another embodiment of the invention showing the primary and secondary hose assemblies connected, with FIGS. 7A and 7B showing detailed components and FIG. 7C being an end view as indicated along the line 7C—7C in FIG. 7; and, FIG. 8 is a longitudinal sectional view of the hose-in-hose of FIG. 7 showing the secondary coupler in a retracted position and the primary coupler disconnected.
Figure 8:
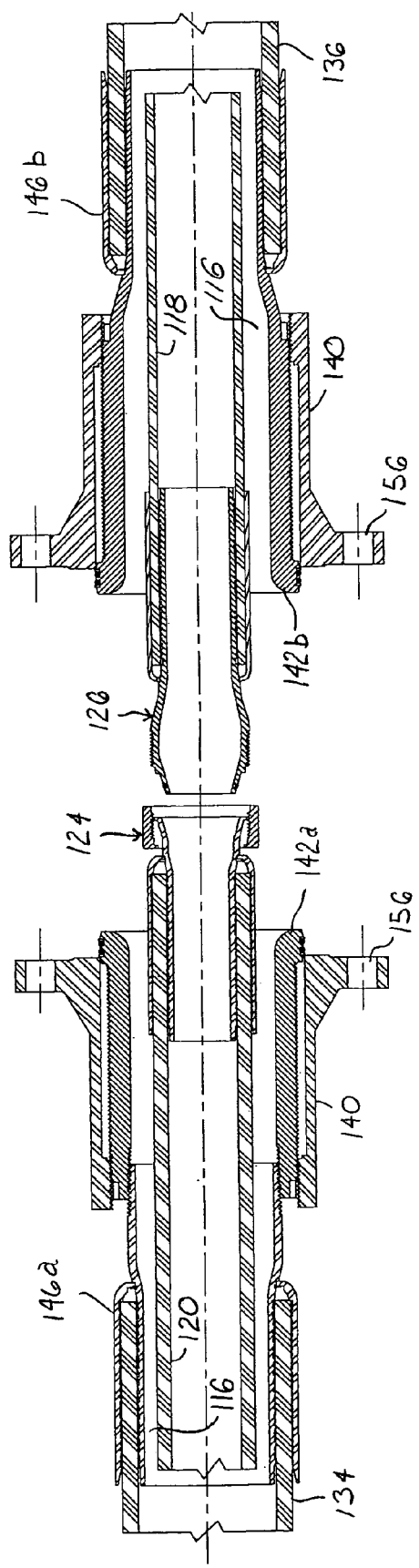

A second embodiment of the invention is shown in FIGS. 7–8, with reference character 110 generally designating a hose-in-hose in accordance with this embodiment of the invention. Hose-in-hose 110 includes an inner or primary hose assembly 112 and an outer or secondary hose assembly 114. Outer hose assembly 114 encases inner hose assembly 112, creating a containment space 116 therebetween for containing in any leakage from the inner hose assembly.

Inner or primary hose assembly 112 includes a hose casing 118, a hose casing 120, and an inner or primary coupler 122 for sealingly connecting hose casings 118 and 120. Coupler 122 includes a female coupler part 124 attached to hose casing 120 and a male coupler part 126 attached to hose casing 118. Coupler parts 124, 126 are each connected to their respective hose casings 120, 118 with a swaged ferrule 132. Female coupler part 124 carries a rotatable threaded nut 130 and includes an outturned retainer flange 128 for retaining the nut on the coupler part. Male coupler part 128 is tapered to fit into retainer flange 128 and is externally threaded for securement within retainer flange 128 by nut 130.

Outer or secondary hose assembly 114 includes a hose casing 134, a hose casing 136, and an outer or secondary coupler 138 for sealingly connecting hose casings 134 and 136. Outer coupler 138 includes threaded sleeves 140, threaded shanks 142a, 142b, and threaded collars 144. Shank 142b is fixedly attached to hose casing 136 by a swaged ferrule 146b. Shank 142a is attached to hose casing 134 by a swaged ferrule 146a carried by a stem 145. Shank 142a is shown threadedly connected to stem 145 by a tapered interfit as an alternative connection used in some hose constructions. Alternatively, the shanks could be either both threadedly engaged to the stems or both fixedly engaged to the shanks.

Each sleeve 140 has an inturned annular flange 148 at one end for threaded engagement with its shank and an outlined annular flange 150 at the opposite end. Each sleeve 140 is threadedly shiftable along its respective shank 142a,b between an extended position as shown in FIG. 7 and a retracted position as shown in FIG. 8. Each shank 142a,b has an outturned annular flange 152a,b at one end 147a,b for abutting flange 148 on its overlying sleeve 140 to prevent the sleeve from unscrewing off the flange end of the shank. Sleeves 140 may be removed from shanks 142a,b by being unscrewed over the ends 149a,b of their respective shanks opposite flange 152a,b. Ring seals 154 are carried by flanges 152a,b to provide a seal between shanks 142a,b and their respective sleeves 140. Flanges 150 on sleeves 140 have circumferentially spaced longitudinal holes 156 therethrough which are alignable for inserting bolts 158 to secure the sleeves together when in their extended positions.

Outer coupler 138 is closed about inner coupler 122 by securing the opposing sleeves 140 together in their extended positions as shown in FIG. 7. To close outer coupler, sleeves 140 are screwed and shifted into their extended position over shanks 142*a,b* and secured together with bolts 158 and collars 144. With sleeves 140 in their extended position, holes 156 in opposing flanges 150 are aligned and bolts 158 secured through the aligned holes. Collars 144 are then screwed over the ends 149*a,b* of shanks 142*a,b* to tightly abut sleeves 140 when in their extended positions thereby preventing the connected sleeves from shifting relative to the shanks. A gasket or other seal mechanism 160 is interposed between the extended sleeves 140 to provide a seal therebetween.

When it is desired to access inner coupler 122, outer coupler 138 is opened to expose the inner coupler. To open outer coupler, sleeves 140 are unscrewed and shifted to their retracted position as seen in FIG. 8 by first unscrewing collars 144 over ends 149*a,b* of shanks 142*a,b*, then removing bolts 158 from holes 156, and finally unscrewing the sleeves toward ends 149*a,b* of the shanks. In this exposed situation, inner coupler 122 may be connected and disconnected.

The detailed description related herein is only meant to exemplify the preferred embodiment of the invention to enable those skilled in the art to make and use it. The subject invention is not to be limited to the details given above for the preferred embodiment, but may be modified within the scope of the impending claims.

I claim:

1. A hose-in-hose comprising a longitudinally extended inner hose assembly including a first hose casing, a second hose casing, and a releasable inner coupler for connecting said first and second hose casings; a longitudinally extended outer hose assembly enclosing said inner hose assembly, said outer hose assembly including a third hose casing, a fourth hose casing, and a releasable outer coupler for connecting said third and fourth hose casings; said outer coupler including opposing longitudinally shiftable sleeves associated with each said third and fourth hose casings, each of said sleeves threadedly shiftable relative to its respective associated hose casing between an extended position and a retracted position; said sleeves being connectable in their said extended positions; said sleeves being separated in their said retracted positions to expose said inner coupler.

2. The hose-in-hose of claim 1 wherein said outer coupler includes longitudinally shiftable collars relative to each said third and fourth hose casings, said collars being threadedly shiftable to a position abutting said sleeves for securing each said sleeve in its extended position.

3. The hose-in-hose of claim 1 wherein said sleeves are secured together in said extended position with a fastener.

4. The hose-in-hose of claim 3 wherein said outer coupler includes longitudinally shiftable collars about each said third and fourth hose casings, said collars being threadedly shiftable to a position abutting said sleeves for securing said connected sleeves in their said extended positions.

5. The hose-in-hose of claim 1 wherein said outer coupler includes a tubular shank connected to each of said third and fourth hose casings, one of said sleeves threaded upon one of said shanks, the other of said sleeves threaded upon the other of said shanks.

6. The hose-in-hose of claim 5 and abutment parts carried by each of said shanks and said sleeves to prevent said sleeves from disengaging from said shanks as the sleeves are shifted into their said extended positions.

7. A hose-in-hose comprising a longitudinally extended inner hose assembly including a first hose casing, a second hose casing, and a releasable inner coupler for connecting said first and second hose casings; a longitudinally extended outer hose assembly enclosing said inner hose assembly, said outer hose assembly including a third hose casing, a fourth hose casing, and a releasable outer coupler for connecting said third and fourth hose casings; said outer coupler including opposing longitudinally shiftable sleeves associated with each said third and fourth hose casings, each of said sleeves threadedly shiftable relative to its respective associated hose casing between an extended position and a retracted position; said sleeves being connectable in their said extended positions; said sleeves being separated in their said retracted positions to expose said inner coupler; longitudinally shiftable collars relative to each said third and fourth hose casings, said collars being threadedly shiftable to a position abutting said sleeves for securing each said sleeve in its extended position.

8. The hose-in-hose of claim 7 wherein said sleeves are secured together in said extended position with a fastener.

9. The hose-in-hose of claim 7 wherein said outer coupler includes a tubular shank connected to each of said third and fourth hose casings, one of said sleeves threaded upon one of said shanks, the other of said sleeves threaded upon the other of said shanks.

10. The hose-in-hose of claim 9 and abutment parts carried by each of said shanks and said sleeves to prevent said sleeves from disengaging from said shanks as the sleeves are shifted into their said extended positions.

11. A hose-in-hose comprising a longitudinally extended inner hose assembly including a first hose casing, a second hose casing, and a releasable inner coupler for connecting said first and second hose casings; a longitudinally extended outer hose assembly enclosing said inner hose assembly, said outer hose assembly including a third hose casing, a fourth hose casing, and a releasable outer coupler for connecting said third and fourth hose casings; said outer coupler including opposing longitudinally shiftable sleeves associated with each said third and fourth hose casings, each of said sleeves threadedly shiftable relative to its respective associated hose casing between an extended position and a retracted position; said sleeves being connectable in their said extended positions; said sleeves being separated in their said retracted positions to expose said inner coupler; said outer coupler including a tubular shank connected to each of said third and fourth hose casings, one of said sleeves threaded upon one of said shanks, the other of said sleeves threaded upon the other of said shanks; abutment parts carried by each of said shanks and said sleeves to prevent said sleeves from disengaging from said shanks as the sleeves are shifted into their said extended positions; longitudinally shiftable collars relative to each said third and fourth hose casings, said collars being threadedly shiftable along said shanks to a position abutting said sleeves for securing each said sleeve in its extended position.

* * * * *